United States Patent [19]

Miwa

[11] Patent Number: 5,199,025
[45] Date of Patent: Mar. 30, 1993

[54] LOOP BACK METHOD FOR LOOP TYPE LAN TRANSMISSION LINE

[75] Inventor: Makoto Miwa, Tokyo, Japan

[73] Assignee: Matsushita Electric Industrial Co., Ltd., Osaka, Japan

[21] Appl. No.: 686,144

[22] Filed: Apr. 16, 1991

[30] Foreign Application Priority Data

Apr. 20, 1990 [JP] Japan ................................. 2-105009
Apr. 20, 1990 [JP] Japan ................................. 2-105010

[51] Int. Cl.[5] ............................................... H04J 1/16
[52] U.S. Cl. ..................................... 370/16.1; 370/15
[58] Field of Search ................... 370/14, 15, 16, 16.1

[56] References Cited

U.S. PATENT DOCUMENTS

| | | | |
|---|---|---|---|
| 4,530,085 | 7/1985 | Hamada et al. | 370/16 |
| 4,538,026 | 8/1985 | Yasue | 370/15 |
| 4,542,496 | 9/1985 | Takzyama et al. | 370/16.1 |
| 4,584,677 | 4/1986 | Kosaka | 370/15 |
| 4,704,714 | 11/1987 | Tomizawa et al. | 370/15 |
| 4,710,915 | 1/1987 | Kitahara | 370/85.12 |
| 4,763,315 | 8/1988 | Nakayashiki et al. | 370/15 |
| 4,930,119 | 5/1990 | Kobayashi et al. | 370/16.1 |
| 5,060,226 | 10/1991 | Gewin et al. | 370/15 |

Primary Examiner—Douglas W. Olms
Assistant Examiner—Shick Hom
Attorney, Agent, or Firm—Stevens, Davis, Miller & Mosher

[57] ABSTRACT

A loop back method for a network including a plurality of node units connected in loop by duplexed transmission lines in the opposite directions with each other, wherein the respective node units have a function of detecting failure on the duplexed transmission lines and a loop back function for returning data received from one of the transmission lines to one of the other in the opposite direction, one of the node units commands loop back to all other node units upon detecting failure on the transmission lines, and the one node unit commands the determination of a loop back state to all other node units to thereby perform a loop back operation for the whole network.

8 Claims, 15 Drawing Sheets

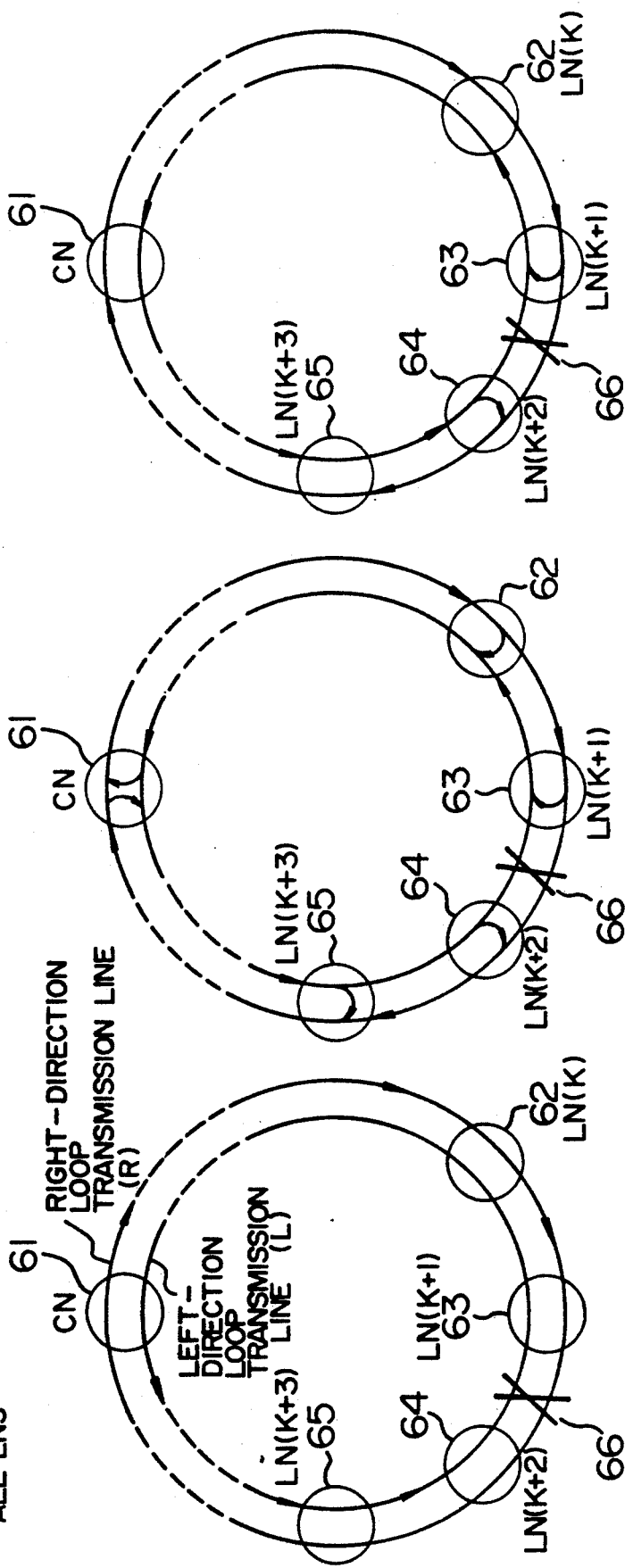

FIG. 9A
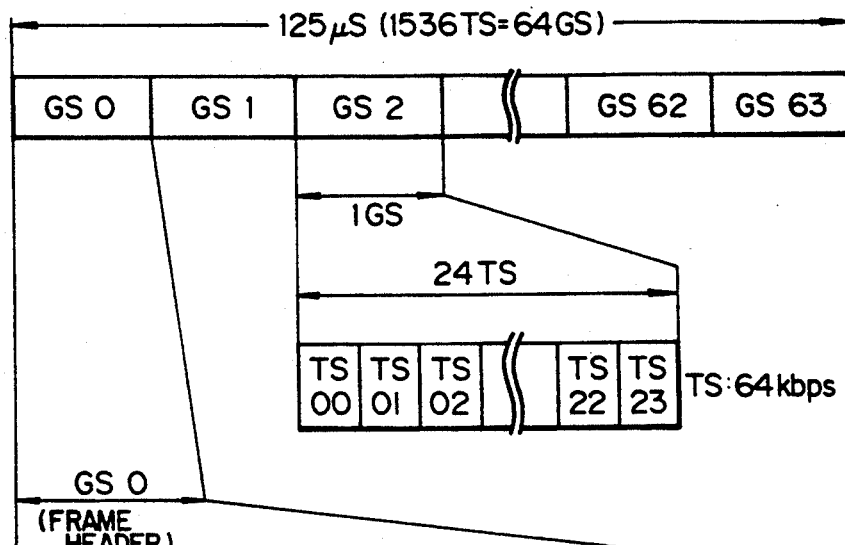
FIG. 9B
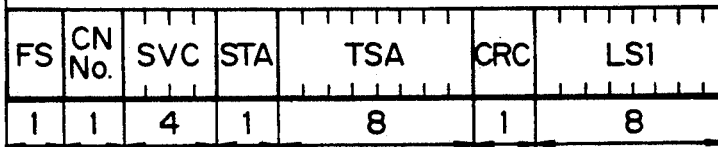
FIG. 9C
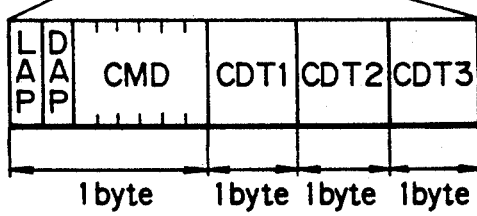
FIG. 9D
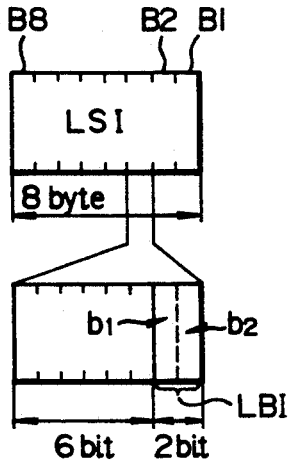
FIG. 9E
| BIT VALUE | | LN LOOP STATE |
|---|---|---|
| b1 | b2 | |
| 0 | 0 | MAINTAIN LEFT→RIGHT LOOP BACK |
| 1 | 0 | MAINTAIN RIGHT→LEFT LOOP BACK |
| 0 | 1 | NO LOOP BACK |

LOOP BACK METHOD FOR LOOP TYPE LAN TRANSMISSION LINE

BACKGROUND OF THE INVENTION

The present invention relates to a loop back method for a loop type local area network when line failure occurs simultaneously in both of duplex loop transmission lines.

FIGS. 1A~1C show a procedure of a loop back operation generally performed when line failure occurs in loop transmission lines.

In the drawings, reference numeral 61 designates a center node unit (hereinbelow referred to as "the CN") having a network supervisory control function, and 62, 63, 64 and 65 some of a plurality of local node units respectively having a connection control function for a subscriber's terminal which are denoted LN(k), LN(k+1), LN(k+2), LN(k+3), respectively. These node units are coupled in a loop shape by duplexed optical transmission lines R [also referred to as a right-direction (clockwise) transmission line] and L [also referred to as a left-direction (counterclockwise) transmission line], the transmission directions of which are opposite to each other.

One (for example, the transmission line R) of the transmission lines R and L is used as a working transmission line while the other (for example, the transmission line L) stands ready for operation as a stand-by transmission line.

In this loop network, all data is formed in accordance with a frame shown in FIG. 2B and transmitted on optical transmission lines. One frame is composed of 64 GS (group slot) and circulated on the transmission lines at intervals of 125 μs (8 kHz).

In FIG. 1A, the right-direction and left-direction loop transmission lines are used as transmission lines in the opposite directions to each other through which frames created by the center node unit 61 are transmitted. Each of the local node units 62, 63, ... performs a relay operation: reproduces a received signal from the transmission lines, recognizes frame synchronization, and transmits the received data to the succeeding local node.

The data transmission between the node units can be performed only on the working loop or transmission line. In other words, data on the standby loop can merely be relayed at each of the local node units.

Each of FIGS. 1A~1C shows a situation where line failure 66 occurs simultaneously on the transmission lines R and L between the LN(k+1) 63 and the LN(k+2) 64.

More specifically, FIG. 1A shows that the CN has detected the failure (interruption of optical input, out of frame synchronization or the like) on both transmission lines and transmitted a simultaneous loop back setting command (hereinbelow denoted "the LBC") to all the LNs through both loop transmission lines.

FIG. 1B shows that all the LNs are performing a loop back operation, wherein each LN maintains a relay operation of the LBC on the loop transmission line through which each LN has received the LBC and returns the LBC on the opposite loop transmission line.

FIG. 1C shows that the loop back operation has been completed, wherein LNs which have received optical signals from both of the loop transmission lines and recognized frame synchronization stop the loop back operation, and the LNs on both sides of the failure location, where frame synchronization has not been established on at least one of the loop transmission lines, still maintain the loop back operation.

FIG. 2A illustrates a block diagram of the configuration of the node unit (CN or LN). As shown in the drawing, there are provided duplex optical-electric conversion units 70R and 70L and duplex loop interface units 71R and 71L corresponding to the right-direction loop transmission line R and the left-direction loop transmission line L.

Between the optical-electric conversion unit 70R and the loop interface unit 71R and between the optical-electric conversion unit 70L and the loop interface unit 71L there is provided a loop switch unit 72 by which a return line for performing a loop back can be formed between both of the loop transmission lines R and L under the control of a node control unit 76, later described in detail.

The loop interface units 71R and 71L are connected to a time-division multiplex unit 74 through a node bus 73.

Incidentally, the loop interface units 71R and 71L in the CN are respectively provided with a frame generating circuit and a time adjusting circuit (not shown in particular) for making corrections for maintaining regular frame circulation.

The time-division multiplex unit 74 is connected to a node control unit 76, a supervisory control means 77 and a terminal interface control means 78 through an internal bus 75.

Although not shown in particular, the node control unit 76 is composed of a microprocessor, a ROM, a RAM, an interrupt control circuit and a variety of interval timers.

The supervisory control means 77 performs a system status monitoring, failure recovery and diagnosis, while the terminal interface means 78 performs a communication control between the terminal and the node unit.

A frame header control unit 79 processes for transmitting and receiving various control command information located in a frame header directed from the CN to the LNs and status information directed from the LN to the CN through the loop interface unit 71R or the loop interface unit 71L, and transmits and receives such information to and from the node control unit 76.

FIG. 2B shows a frame format. One frame is composed of 64 group slots (GS), as shown in the drawing, and is circulated at intervals of 125 μs (8 kHz). The head group slot (GS0) of the frame is a synchronization group slot for the frame synchronization establishment and monitoring control, and the remaining 63 group slots are used for data transmission.

Suppose line failure (loop cut or the like) has occurred simultaneously on both of the right and left-direction loop transmission lines (the loop transmission line R and the loop transmission line L), as shown in FIG. 1A.

The CN detects the line failure as an abnormal frame synchronization and transmits a loop back command to all the LNs to perform a loop back operation.

There have been proposed a variety of loop back control methods. However, since the detection method of the fault location depends on the number of installed LNs on a loop transmission line, a loop back recovery requires a long time in the case where a large number of LNs are installed. For this reason, a concurrent loop back method is adopted which requires a short loop back time independent of the number of LNs. A conventional simultaneous loop back operation will hereinbelow be explained with reference to a timing chart shown in FIG. 3, a processing flow diagram of the CN 61 shown in FIG. 4A and a processing flow diagram of the respective LNs shown in FIG. 4B.

The occurrence of a loop line failure (at a time t0 in FIG. 3) causes the two LNs located closest to the failure location (the LN(k+1) and LN(k+2) in this example) to detect the abnormal frame synchronization of the respective loop transmission lines substantially at the same time (at a time t1 in FIG. 3).

The LN(k+1) and LN(k+2) respectively start a guard timer Tm0 set to the time-out period T0.

As the second closest LNs [the LN(k) and LN(k+3) in this example shown in FIG. 1A] to the failure location, the LN(k) detects a left-direction abnormal frame synchronization on the left-direction loop transmission line L at a time t2, while the LN(k+3) detects a right-direction abnormal frame synchronization on the right-direction transmission line R at a time t3.

Afterward, the abnormal frame synchronization is propagated and detected sequentially by the adjacent LNs. Finally, the CN detects the abnormal frame synchronization on the left-direction loop transmission line at a time t4 and the abnormal frame synchronization on the right-direction loop transmission line at a time t5, and thereby recognizes the abnormal frame synchronization on both of the right-direction and left-direction transmission lines (this state is called "abnormal dual loop frame synchronization). Incidentally, each LN starts the guard timer simultaneously upon detecting the abnormal frame synchronization and checks again the frame synchronization on both of the left-direction and right-direction transmission lines after the time-out period.

Since the respective LNs located on the downstream side viewed from the flow of signals on the right-direction loop transmission line R (for current use of data transmission) detect a right-direction abnormal frame synchronization, the left-direction loop transmission line L (for back up) is switched to operate as the transmission line for current use of data transmission. This switch enables the respective LNs on the downstream side of the failure location to receive a loop back setting command from the CN.

The CN, when detecting the abnormal frame synchronization on both of the transmission lines L and R at the time t5, starts a guard timer Tm1 set to the time-out period T1 and checks again the frame synchronization on both of the transmission lines at a time t6 after the time-out period T1.

If the result of the second check indicates that the dual loop abnormal frame synchronization is still continuing, the CN 61 transmits a loop back setting command to all the LNs. The CN 61 itself also transmits an inputted signal on the working right-direction loop transmission line R to the output side of the standby left-direction loop transmission line L and transmits an inputted signal on the standby left-direction loop transmission line L to the output side of the right-direction loop transmission line R (this operation is called "the dual line loop back"). The CN then starts a guard timer Tm2 set to time-out period T2.

Upon receiving the loop back setting command from the CN, the respective LNs on the upstream side viewed from the flow of signals on the right-direction loop transmission line R (the working transmission line) perform a return from the right-direction loop transmission line R to the left-direction loop transmission line L (hereinbelow called the right-to-left loop back) and start a guard timer Tm3 set to time-out period T3.

The state at this time is as shown in FIG. 1B.

The respective LNs again check the frame synchronization of received data after the time-out period T3. If the result of the second check indicates that both of the right-direction and left-direction transmission lines are both normal as to a given LN, that LN releases its loop back state. If at least one of the right-direction and left-direction loop transmission lines continues the abnormal frame synchronization as to a given LN, the loop back state of that LN is maintained.

On the other hand, CN 61 checks the frame synchronization of received data on both of the transmission lines after the lapse of the time-out period T2 set on the guard timer Tm2, and if the synchronization is normal, then CN 61 releases the dual-line loop back.

Thus, the above-mentioned conventional loop back method is also capable of recovering the left-direction and right-direction loop transmission lines from failure occurring simultaneously on both of the transmission lines.

However, the respective LNs, upon receiving the loop back setting command from the CN, individually set the guard times taking into account a period necessary to recover from a disturbance in the frame synchronization which occurs on the loop transmission lines when they perform the loop back operation. The CN in turn has to set the guard timer so as to cover all time-out periods set on the respective guard timers of all the LNs. Thus, the above-mentioned conventional loop back method encounters a problem in that an extremely long time is required until the loop back operation is finally completed.

The conventional loop back method also implies a problem that the CN does not particularly monitor the operating states of the respective LNs at the time of completing a loop back operation in the whole loop network, so that it is not possible to detect a fault location in a loop back state.

Further, the LNs, if failing to receive a loop back setting command from the CN, can no longer recover to the normal operation.

The aforementioned conventional loop back method further implies a problem in that the node units cannot maintain a loop back state when an extremely short failure such as a momentary interruption of power supply occurs on a transmission line and thereby fall into a loop back failure state.

SUMMARY OF THE INVENTION

The present invention is intended to solve the above mentioned problems of the prior art and its general object is to provide an improved loop back method which is capable of ensuring a loop back operation when a line fault occurs, reducing a recovery time necessary for the loop back operation, and attending to a variety of failure situations.

Therefore, it is a first object of the present invention to provide: (1) a loop back method which manages a timer for determining the loop back state of each node unit and performs management of node units in the loop back state for state management and recovery from failure, (2) a cyclic transmission of commands, and addition of loop state information to a command.

It is another object of the present invention to provide a loop back method which is capable of recovering loops from abnormal states such as a momentary interruption of transmission lines by managing node units in a loop back state and retrying a recovery operation.

According to one aspect of the present invention, there is provided a loop back method for a network including a plurality of node units connected in a loop by duplexed transmission lines in opposite directions relative to each other, wherein the respective node units have a function of detecting failure on the duplexed transmission lines and a loop back function for returning data received from one of the transmission lines in the opposite direction, one of the node units commands loop back to all other node units upon detecting failure on the transmission lines, and the above one node unit commands the determination of a loop back state to all other node units to thereby perform a loop back operation for the whole network.

According to another aspect of the present invention, there is provided a loop back method for a local area network comprising two loop transmission lines, the transmission directions of which are opposite to each other, and a plurality of local node units and a center node unit connected to the two loop transmission lines, the method being adapted to recover from a line failure which occurs on the two loop transmission lines such that local node units adjacent to the failure location on the transmission lines form loop back, wherein the center node unit, upon detecting line failure on both of the two loop transmission lines, transmits a command for instructing a simultaneous loop back operation to all the local node units, and the center node unit further transmits, after the lapse of a predetermined guard time, a command for instructing all of the local node units with respect to individually determining whether the loop back state is maintained or released to the respective local node units, thereby performing the loop back operation for the whole network.

According to the present invention, a node unit, for example, the CN, transmits to other node units, for example, the respective LNs, a loop back determination command for determining whether a loop back state is maintained or released depending on the presence or absence of the establishment of frame synchronization on both of the loop transmission lines in the respective LNs, and then, in accordance with the result of the command reception, transmits a loop back diagnosis command for instructing the respective LNs of with respect to responding to the CN that each of the LNs is maintaining or has released the loop back state, thereby making it possible to reduce a time necessary to form loop back on both of the current use and back up loop transmission lines, when a line failure occurs, and to improve the accuracy of the loop back operation, which results in producing large effects in recovering a loop network from failure.

BRIEF DESCRIPTION OF THE DRAWINGS

FIGS. 1A~1C are explanatory diagrams for explaining a general loop back operation effected when line failure occurs;

FIG. 8A1–8A3 illustrates a processing flow of the CN of the embodiment when line failure occurs;

FIG. 8B1–8B2 is a processing flow of the respective LN of the embodiment when line failure occurs;

FIGS. 9A–9E are diagrams showing a frame format of data on a loop transmission line in command transmission and reception.

DESCRIPTION OF THE PREFERRED EMBODIMENTS

Figure 2A:
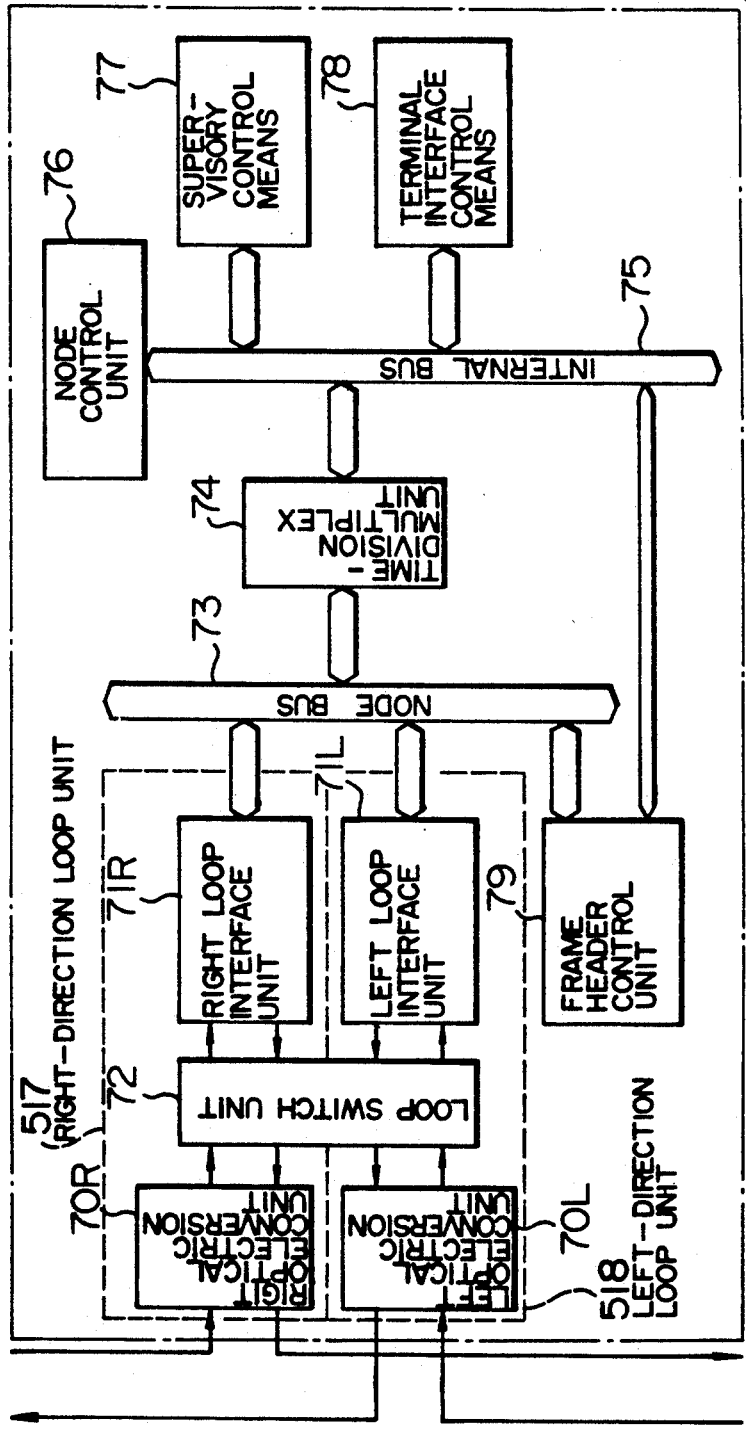
FIG. 2A is a block diagram showing the configuration of a conventional node unit (CN or LN)
Figure 2B:
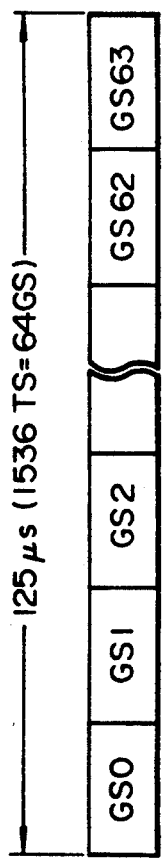
FIG. 2B is a diagram showing a frame format transmitted among node units whose configuration is shown in FIG. 2A.
Figure 3:
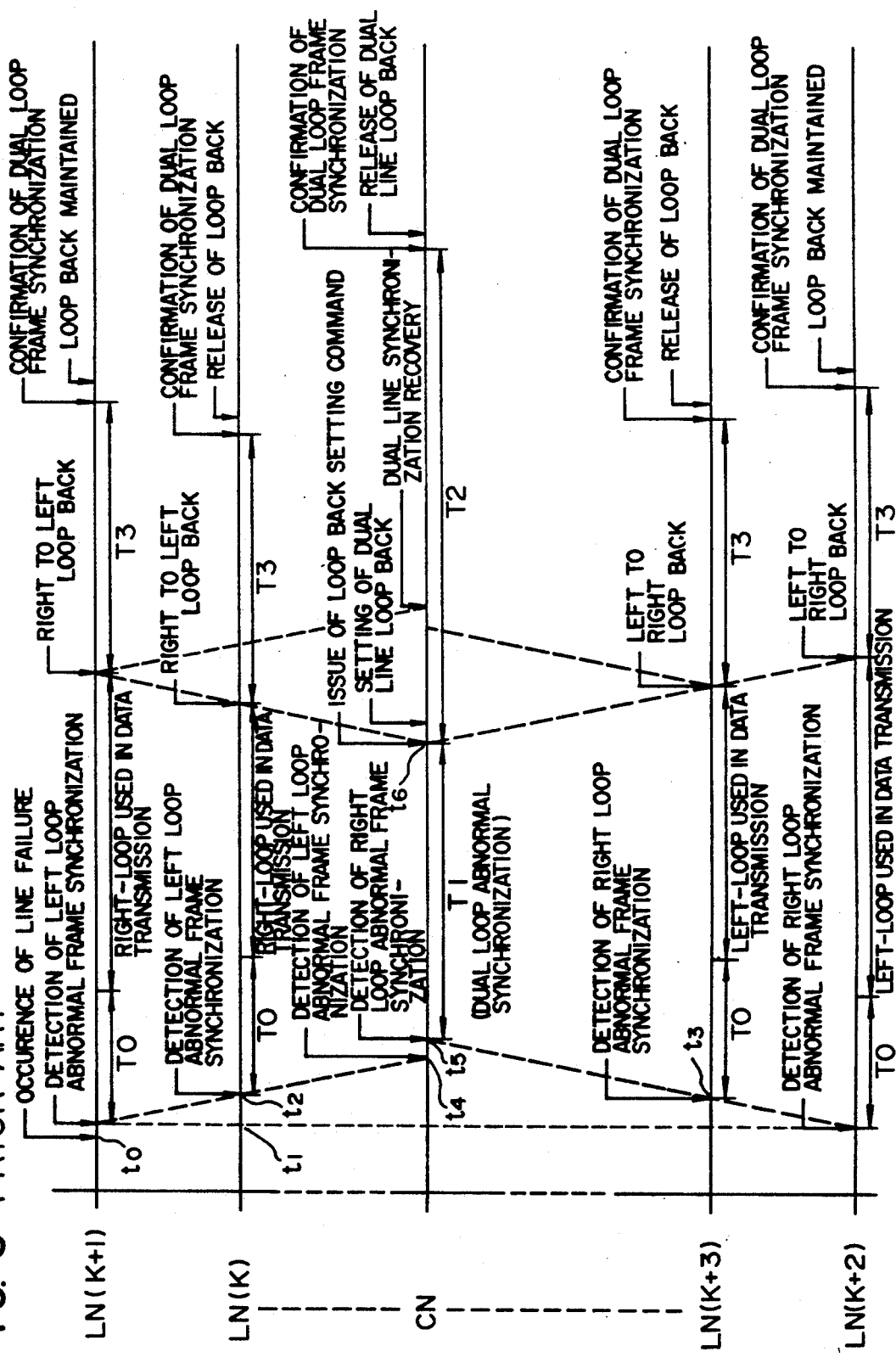
FIG. 3 is a timing chart showing a procedure of command transmission and reception performed among the CN and the respective LNs according to the prior art.
Figure 4A:
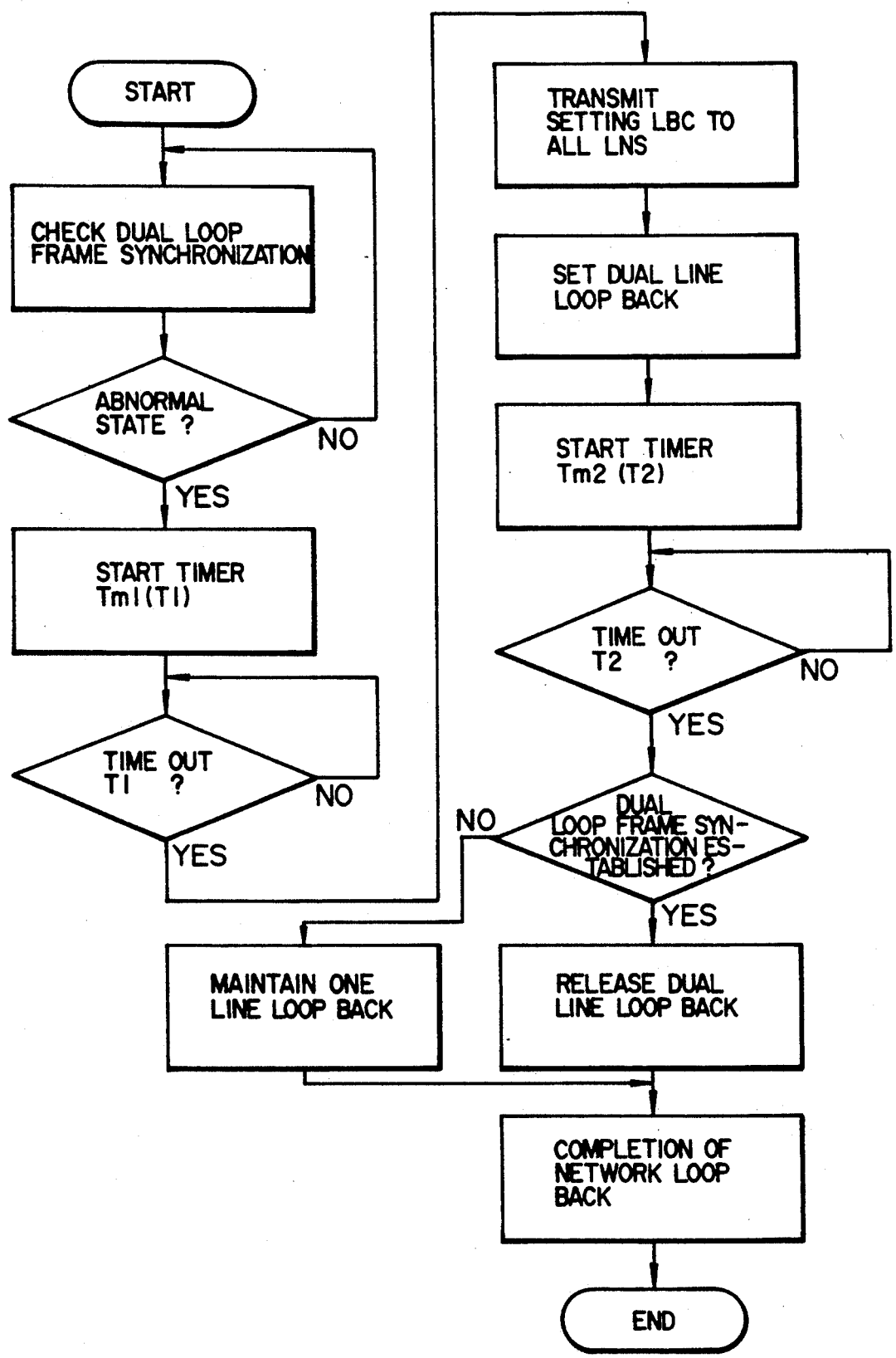
FIG. 4A illustrates a flow chart of processes of the CN according to the prior art when line failure occurs.
Figure 4B:
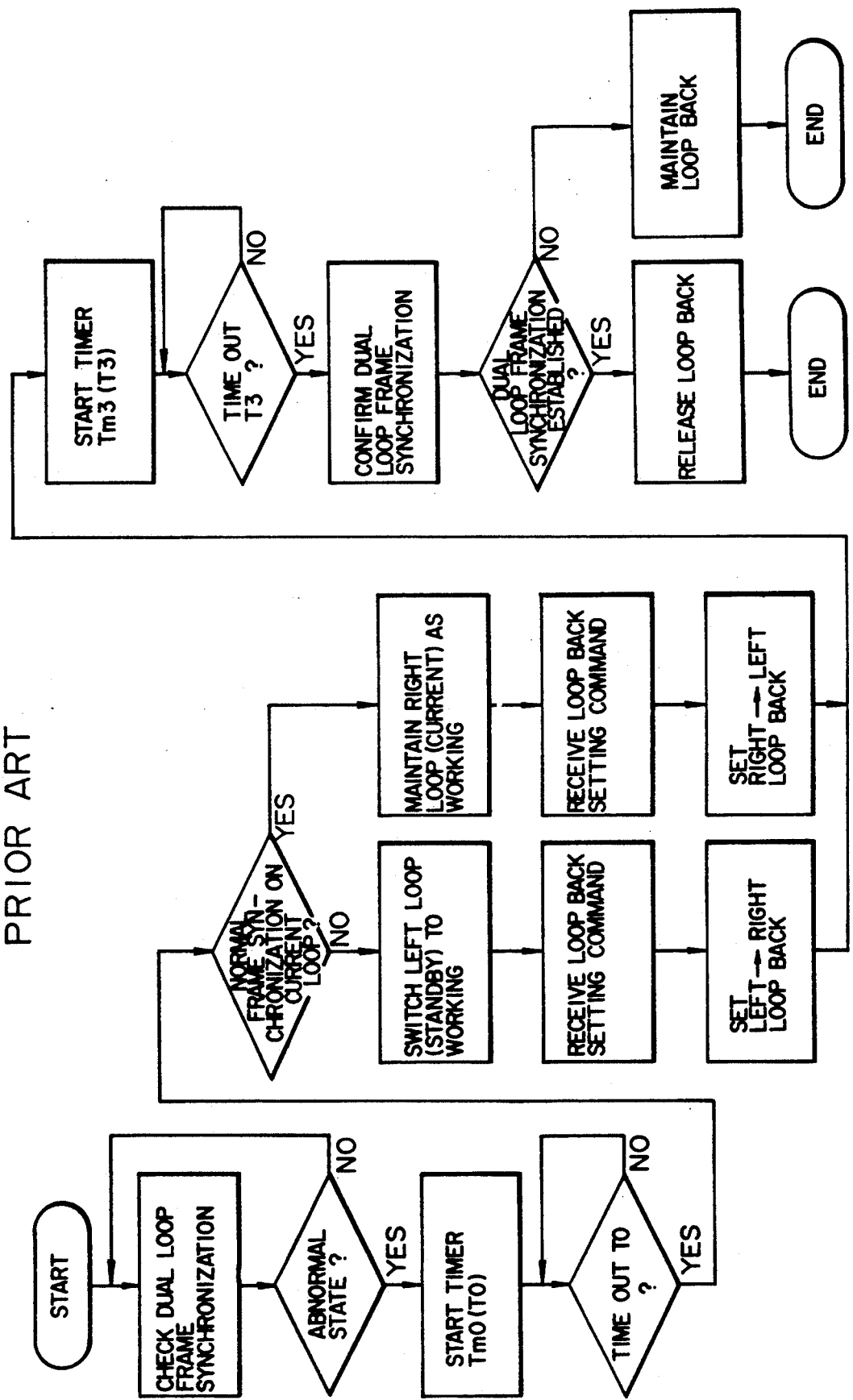
FIG. 4B illustrates a flow chart of processes of each LN according to the prior art when line failure occurs.
Figure 5:
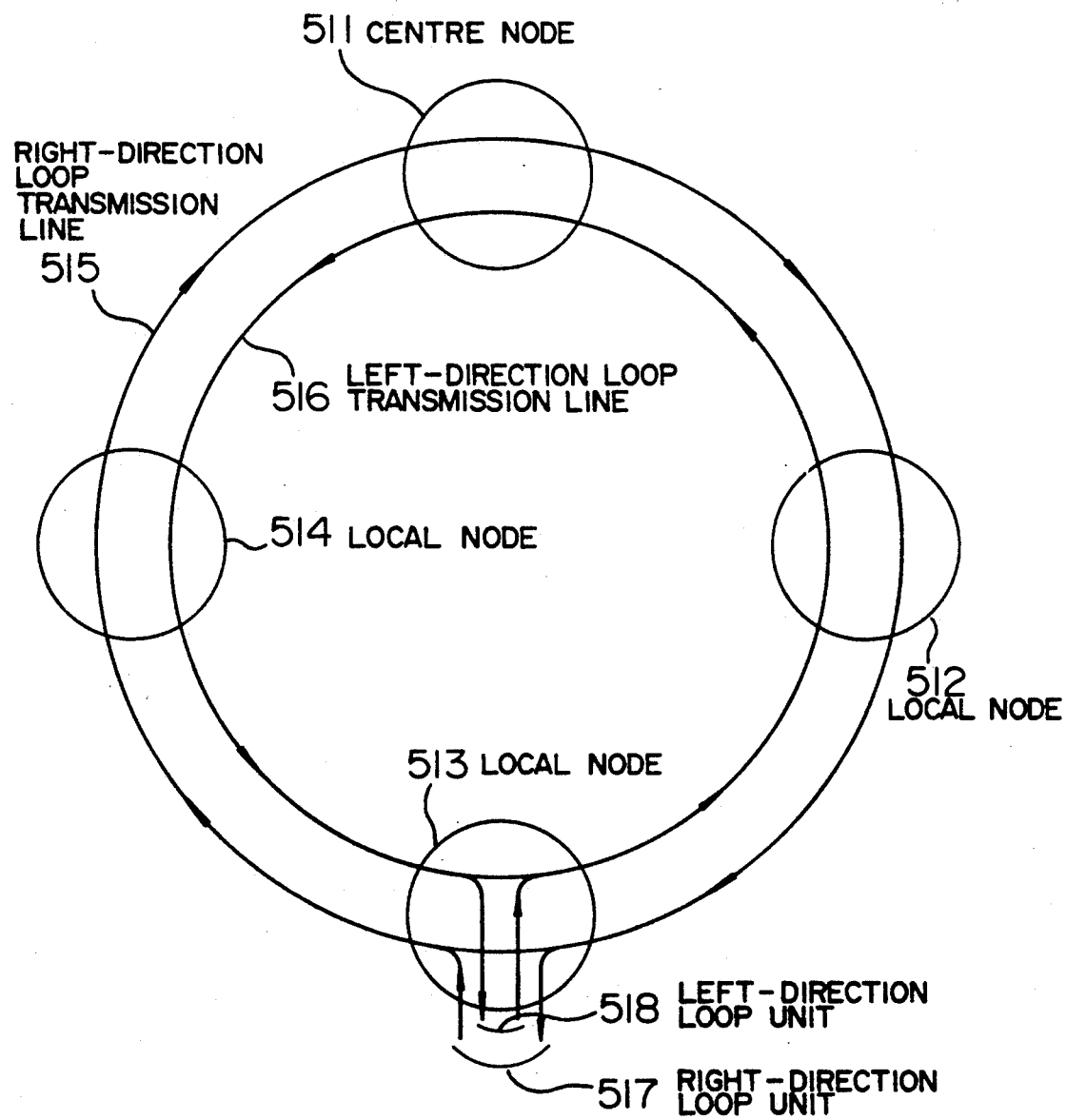
FIG. 5 is a diagram showing an example of a loop network configuration used for explaining a loop back method of an embodiment according to the present invention.

FIG. 5 shows a simplified configuration of the loop network used for explaining an embodiment of the present invention in principle. In the drawing, reference numeral 511 designates a center node unit, 512, 513 and 514 local node units, 515 a right-direction loop transmission line R, 516 a left direction loop transmission line L, 517 a Right-Direction Loop Unit corresponding to the right-direction loop of the local node unit 513, and 518 a Left-Direction Loop Unit corresponding to the left-direction loop of the local node unit 513. These node units are provided with a supervisory control means having a partially modified internal configuration as shown in FIG. 2A, that is, different recovering process from line failure as described below. In this local network, all data is formatted in a frame shown in FIG. 6 and transmitted on the optical transmission lines.

One frame is composed of 64 GS (group slot), one GS of 24 TS (time slot), and one TS of 8 bits. One frame is therefore composed of 1536 TS (=1536 Bytes=12288 bits). Since one frame is transmitted at intervals of 125 μsec (8 kHz), one TS has a transmission capacity of 64 kbps.

The first group slot GS0 is used for frame synchronization and supervisory control, and is a so called frame header. The remaining GS1~GS63 are used for data transmission.

Figure 6:
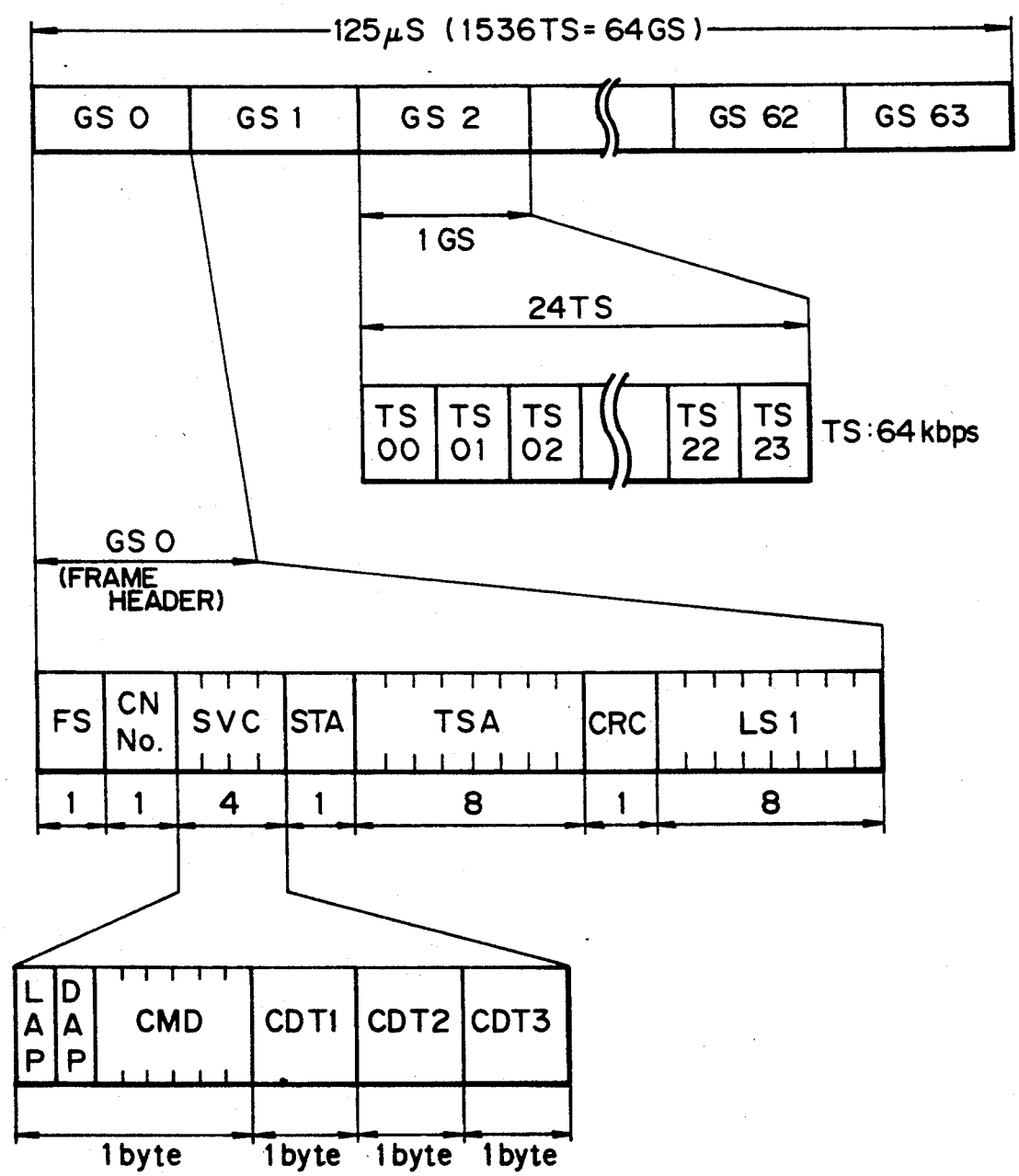
FIG. 6 is a diagram showing a frame format transmitted in a loop network of the embodiment.

In the GS0 there are multiplexed the following data as shown in FIG. 6:

(1) FS: Frame Synchronizing Pattern
 The respective node units detect this pattern to establish the frame synchronization.
(2) CN No.: Center Node Number
 This is data for announcing a number designating the center node unit to all local node units.
(3) SVC: Supervisory Command
 This is data used for a variety of control such as a loop back control and includes the following data:
 (3-1) CMD: Command Code This is a command code area for specifying set/-release of loop back operation and so on which is generated by the center node unit to instruct the local node units to instruct in accordance with this command code. A corresponding local node unit is supposed to instruct with CDT explained below.

(3-2) CDT: Command Data

This is a command area for designating a local node address of a loop back point or the like.

(4) STA: Start Address

This is data for designating a node address when the center node unit performs a diagnosis operation to all local node units.

(5) CRC: Cyclic Redundancy Check

This is data for checking transmission errors of the frame header.

(6) LSI: Local Node Status Indicator

This is a response data area with which a local node unit having a node address designated by the STA returns its loop state to the center node. The LSI includes the following information:

LBI: Loop Back status indicator

This is a 2-bit area for indicating a loop back state of the local node unit.

In FIG. 5, the loop back operations of respective node units on the right-direction and left-direction loops 515, 516 are similar to those of the prior art shown in FIGS. 1A~1C except that the above-mentioned data format is different. However, they are controlled so as to perform different processing from the prior art example when line failure occurs.

If line failure occur in both of the left-direction and right-direction loops 515, 516, a loop back operation is performed in accordance with a following procedure:

(1) Abnormal frame synchronization is detected in a certain local node unit due to line failure;

(2) The first local node unit which has detected the abnormal frame synchronization starts a guard timer and sets the time-out period to T0;

(3) The second local node unit which is situated in the adjacent location also detects the abnormal frame synchronization and starts a guard timer and sets the time-out period to T0;

(4) This operation is sequentially transmitted to a next adjacent local node, and finally the center node unit detects the dual line abnormal synchronization;

(5) The center node unit starts a guard timer and sets the time-out period to T1 upon detecting the abnormal synchronization on the dual transmission line. The center node unit checks a reconfiguration of the dual loop abnormal synchronization after the lapse of a time out period T1 set on the guard timer Tm1;

(6) If the result of reconfirmation shows the frame synchronization is abnormal in both of the loops, the center node unit sends a loop back setting command to all local node units. The center node unit itself also does a loop back operation as a dual line loop back point and starts a timer T2;

(7) Prior to the operation (6), the local node unit, if reconfirming the abnormal frame synchronization after the lapse of a time-out period set on the timer Tm0, switches the currently used or working loop transmission line to the back up or stand-by loop locally, for the purpose of receiving a command from the center node unit;

(8) The local node unit receives the loop back setting command from the center node unit and switches the transmission direction so as to enable the loop back from the normally synchronized loop to the other loop;

(9) The center node unit confirms the frame synchronization after the lapse of a time-out period set on the timer Tm2 and sends a loop back determination command to all the local node units if both of the loop transmission lines exhibit the normal frame synchronization. At the same time, the center node unit starts the frame synchronization guard timer Tm1. The center node unit itself is set in a loop back relay state;

(10) The local node unit, upon receiving the loop back determination command from the center node unit, reconfirms the frame synchronization. If the result of the reconfiguration shows that the frame synchronization is normal in both of the loops, the loop back state is released. On the contrary, if the abnormal frame synchronization has been detected in one or both of the loops, the loop back state of its node is maintained;

(11) The center node unit confirms the frame synchronization after the time-out period set on the guard timer Tm1. If the result of the confirmation shows that the frame synchronization is normal in both of the loops, a loop back point is searched by a loop back diagnosis command using the frame header. If two loop back points are detected in the whole network, it is recognized that the loop back of the whole network has been formed;

(12) When it is recognized that the whole loop back has been formed, the center node unit transmits the loop back determination command with the node addresses indicating the loop back points added in a CDT area of the loop back determination command;

(13) A node unit which takes part in the loop network after the loop back has been formed by the above operation (12) can recognize the loop state and normally join the loop network by referring to the loop back determination command and the loop back point node addresses; and

(14) The various commands used in the loop back operation are set on the frame header, and the frame is cyclically transmitted on the loop, whereby each local node unit can detect such commands after constant time intervals even if it fails to receive the commands.

Thus, the above-mentioned embodiment is advantageous in that one of the node units (for example, the center node unit 61 in FIGS. 1A~1C) manages the timing of determining a loop back, thereby making it possible to accurately perform the loop back operation and reduce the time to achieve a whole loop back.

In the above-mentioned embodiment, the following step may be inserted between the steps 11 and 12:

If two node units in the loop back state cannot be detected as the result of searching for the loop back points, the center node unit once issues a command for releasing the loop back state to all the local node units and repeats the aforementioned steps 5~11 after a predetermined time period. The number of times in this retry operation is set as an upper limit. If two node units in the loop back state cannot be detected by repeating the loop back point search in excess of the upper limit time, it is regarded that the loop back has failed in the whole loop network.

This modified embodiment having the additional step 11a inserted between the step 11 and 12 has an advantage in that, in a case where an extremely short-time line failure occurs, if the center node unit detects that two node units do not exist which are performing the loop back in the whole loop network after the loop back operation, the center node unit commands all the local node units to release the loop back and then retransmits the loop back command, thereby making it possible to detect the existence of node units remaining in the loop back state and recover the loop in a normal state without falling into a loop back failure state.

The above-mentioned concurrent loop back process as shown loop back operation in general loop transmission lines shown in FIGS. 1A~1C, will be explained with reference to a timing chart of FIG. 7, a processing flow chart, showing the operation of the CN, of FIG. 8A, a processing flow chart, showing the operation of the LNs, of FIG. 8B, and a frame format diagram of FIG. 9.

Figure 7:
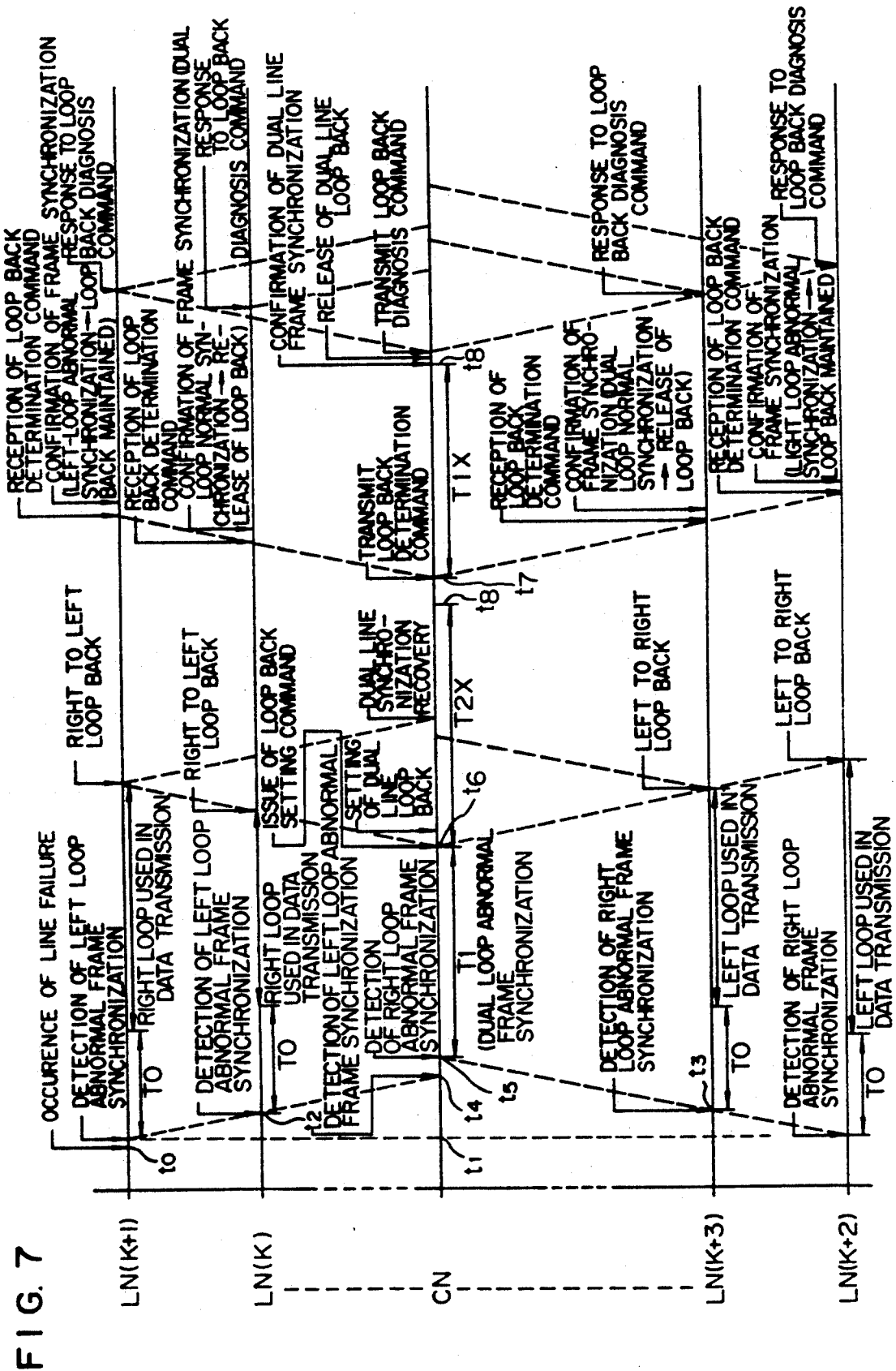
FIG. 7 is a timing chart showing a procedure of command transmission and reception performed among the CN and the respective LNs in a generally modified example of the above-mentioned embodiment of the present invention.

FIG. 7 shows a timing chart of command transmission and reception operations performed among a CN and respective LNs of the embodiment. In the following explanation of the embodiment, FIGS. 1A~1C will be employed again in the explanation of the concurrent loop back process on the occurrence of line failure.

Figures 1, 8A:
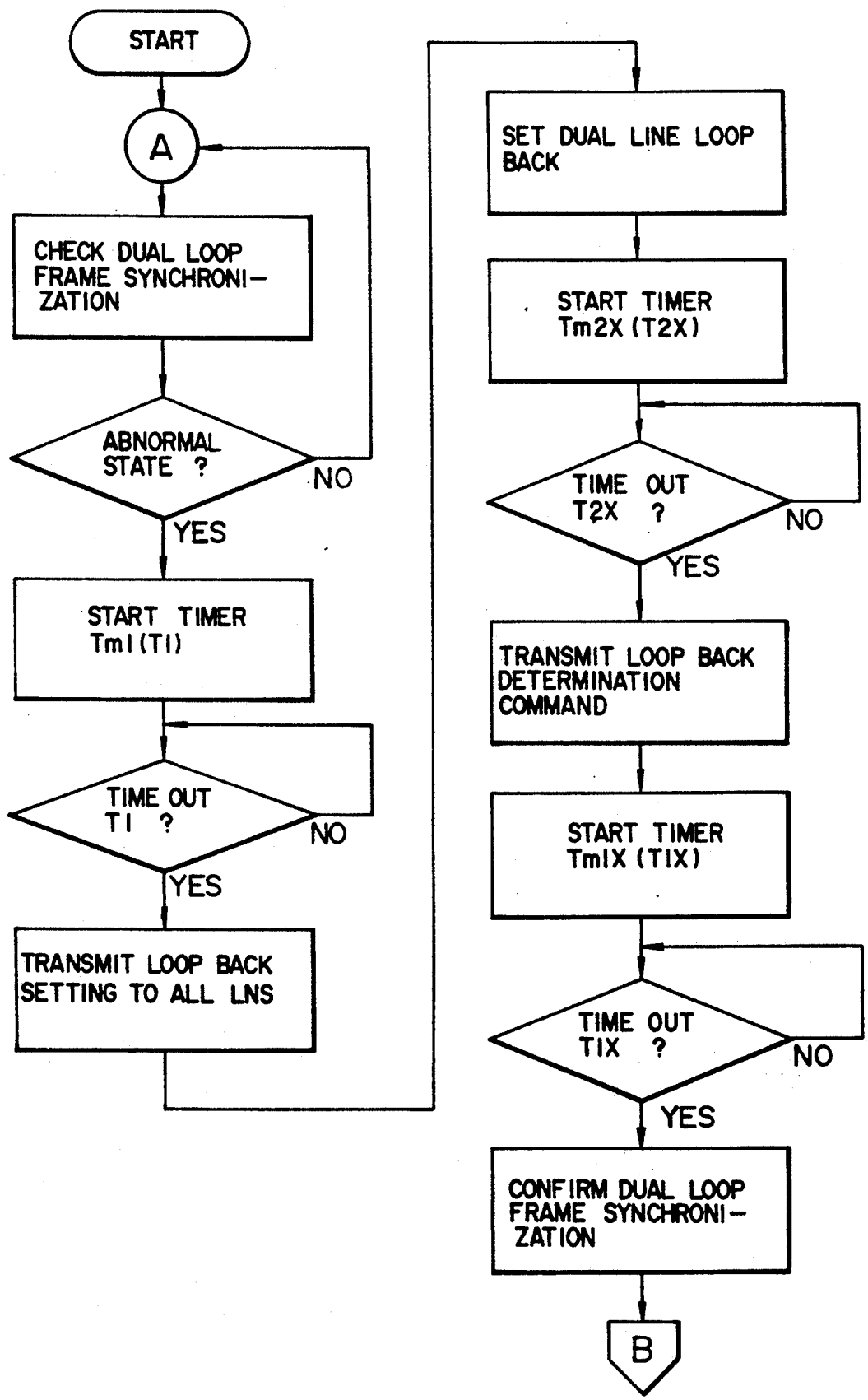
Figures 2, 8A:
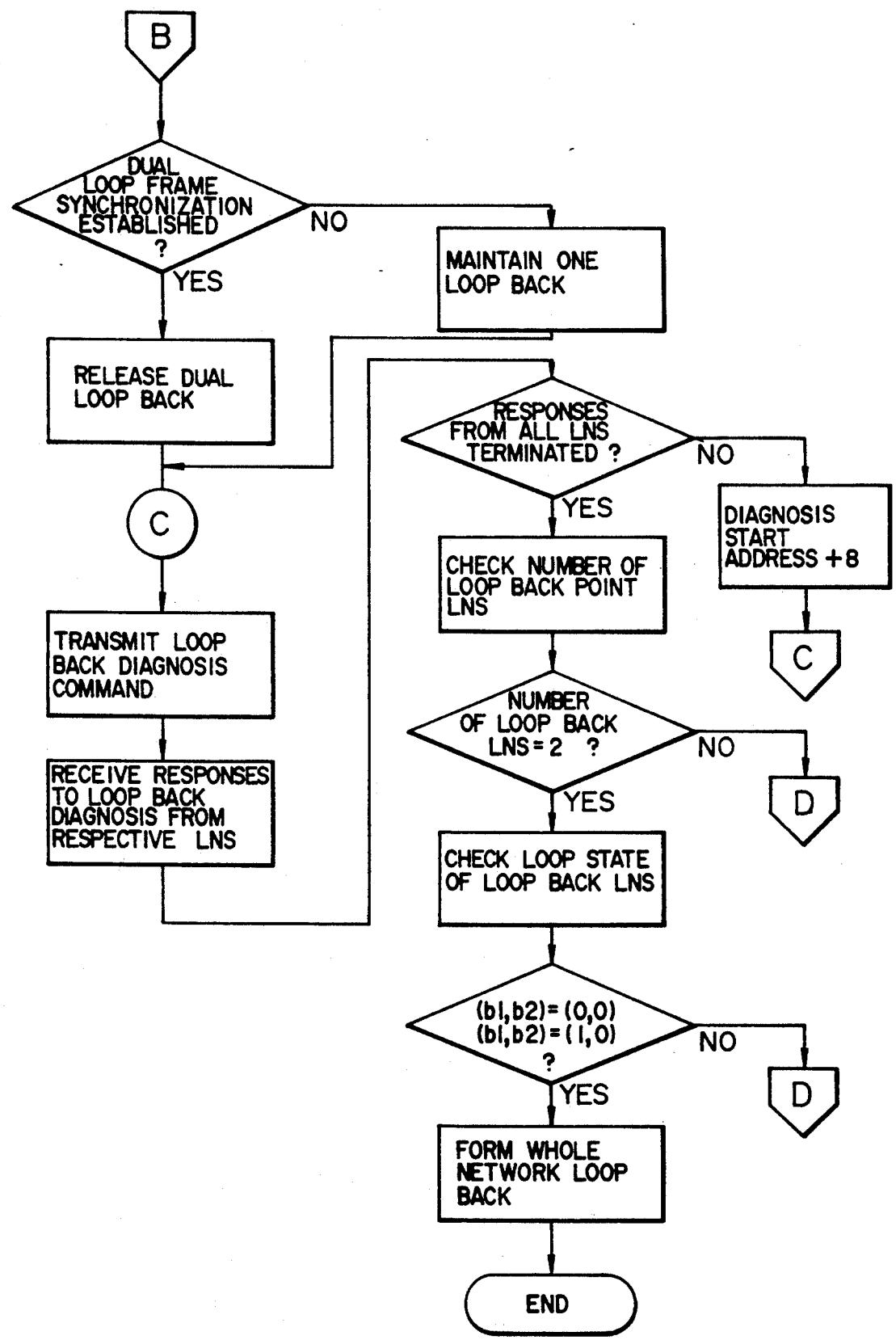
Figures 3, 8A:
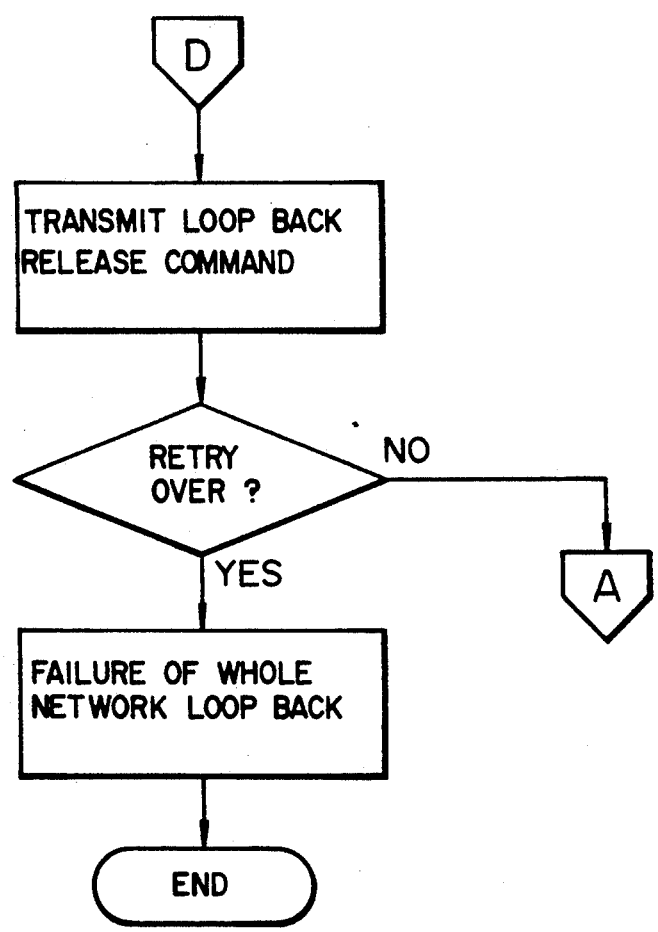
Figures 1, 8B:
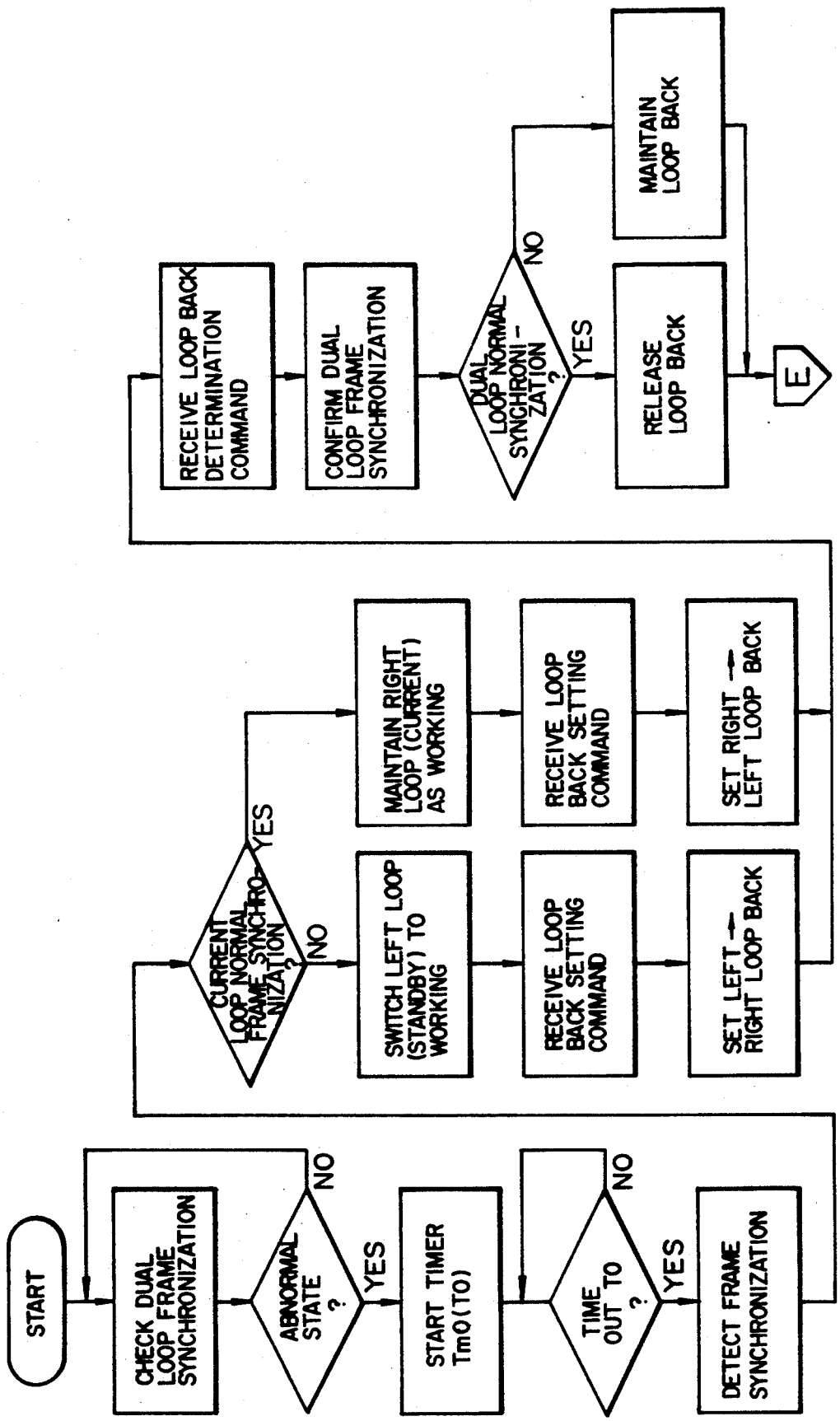
Figures 2, 8B:
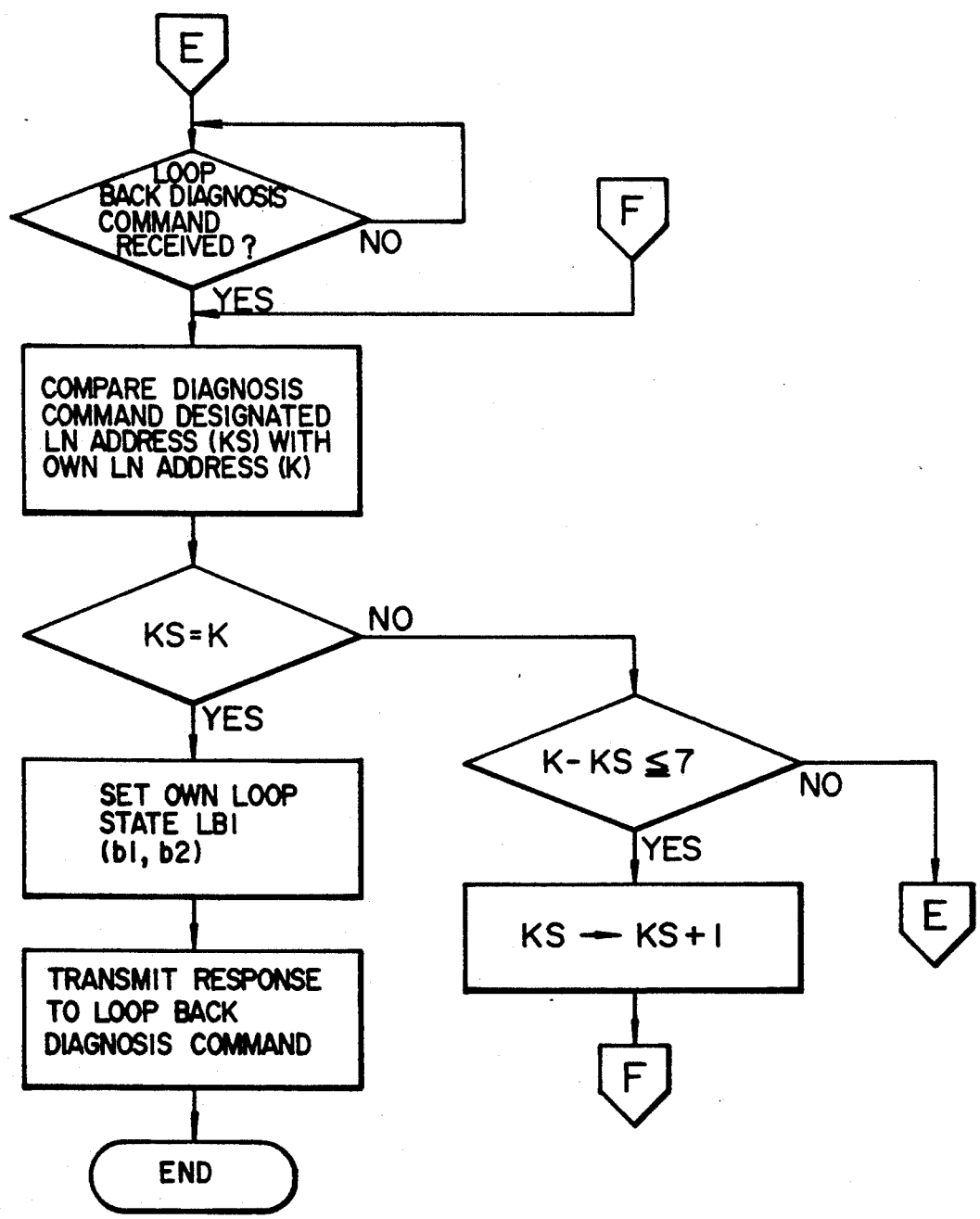

FIGS. 8A and 8B are processing flow charts respectively showing loop back process performed by the CN and the respective LNs when line failure occurs.

FIGS. 9A~9E show a frame format of data used for command transmission and reception on the loop transmission lines, wherein the format shown in FIGS. 9A~9C is details of that shown in FIG. 6.

Figure 10:
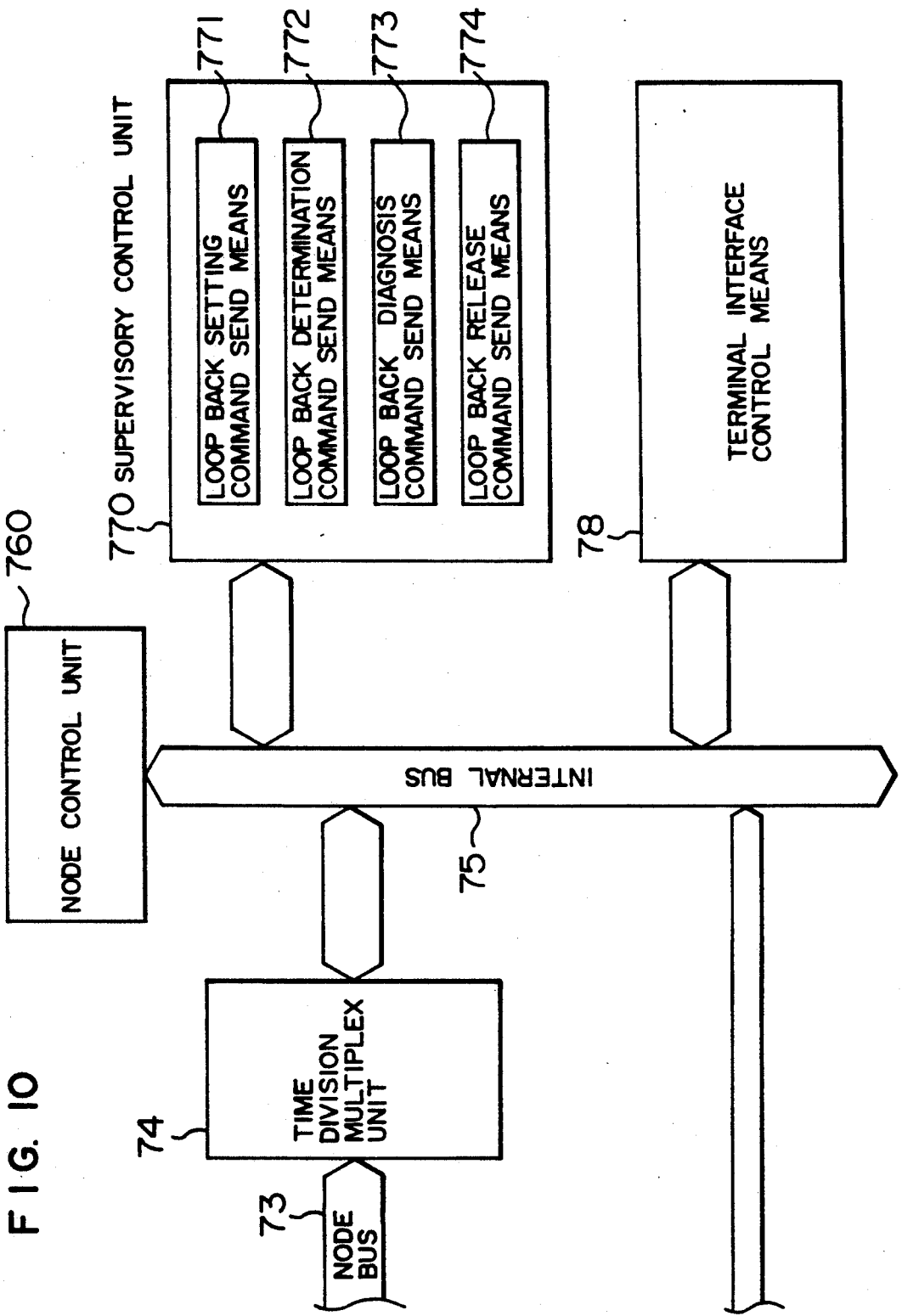
FIG. 10 is a block diagram showing the configuration of a node unit of the embodiment.

Incidentally, the configurations of the CN and the LN in the present embodiment are partially similar to those shown in FIG. 2A, however, with respect to the loop back process performed by supervisory control means 770 based on the control of a node control unit 760, both elements 760 and 770 shown in FIG. 10 are different. The supervisory control unit 770 comprises the loop back setting command send means 771, the loop back determination command send means 772, the local node diagnosis command send means 773 and the loop back release command send means 774. The loop back process performed by the CN and the respective LNs when line failure occurs is shown by the processing flow chart of FIGS. 8A and 8B, respectively.

Due to the occurrence of line failure (at the time t0 in FIG. 7), the two closest LNs to the failure location (LN(k+1) and LN(k+2) in this example) detect abnormal frame synchronization almost at the same time (at the time t1 in FIG. 7).

The LN(k+1) 63 and LN(k+2) 64 respectively start a guard timer Tm0 (time-out period T0).

As the second, closest LNs to the failure location, the LN(k) 62 detects a left-direction abnormal frame synchronization on the left-direction loop transmission line L at the time t2, while the LN(k+3) 65 detects a right-direction abnormal frame synchronization on the right-direction transmission line R at the time t3.

Afterward, the abnormal frame synchronization is propagated and detected sequentially by the next adjacent LNs. Finally, the CN detects the abnormal frame synchronization on the left-direction loop transmission line at the time t4 and the abnormal frame synchronization on the right-direction loop transmission line at the time t5, and thereby recognizes the abnormal frame synchronization on both of the right-direction and left-direction transmission lines (this state is called "dual loop abnormal frame synchronization"). Each LN starts the guard timer Tm0 (time-out period T0) simultaneously upon detecting the abnormal frame synchronization and checks again the frame synchronization on both of the left-direction and right-direction transmission lines after the time-out period T0 has elapsed.

Since the respective LNs located on the downstream side of the failure locations viewed from the flow of signals on the right-direction loop transmission line R (for the current use of data transmission) detect right-direction abnormal frame synchronization, the left-direction loop transmission line L (for back up use) is switched to serve as the working transmission line for current use of data transmission. This switch enables the respective LNs on the downstream side of the failure location to receive a loop back setting command from the CN.

The CN, when detecting the dual-loop abnormal frame synchronization at the time t5, starts a guard timer Tm1 (time-out time T1) and checks again the frame synchronization on both of the loop transmission lines at the time t6 after the time-out period T1 has elapsed.

IF the result of the second check indicates that the dual loop abnormal frame synchronization is still continuing, the CN 61 transmits a loop back setting command to all the LNs at the time t6. The CN 61 itself also transmits a frame signal on the right-direction loop transmission line R to the output side of the left-direction loop transmission line L and transmits a frame signal on the standby left-direction loop transmission line L to the output side of the right-direction loop transmission line R via the loop switch unit 72 in FIG. 2 (this operation is called "the dual line loop back"). The CN then starts a guard timer Tm2x (time-out period T2x).

Upon receiving the loop back setting command from the CN, the respective LNs on the upstream side of the failure location viewed from the flow of signals on the right-direction loop transmission line R (the working transmission line) perform loop back from the right-direction loop transmission line R to the left-direction loop transmission line L (hereinbelow called the right-to-left loop back), while the respective LNs on the downstream side of the failure location on the transmission line perform loop back from the left-direction loop transmission line L to the right-direction loop transmission line (hereinbelow called the left-to-right loop back). At this time, the respective LNs start the guard timers Tm3 (time-out period T3) in the prior art example, however, the timers Tm3 are not started in the present embodiment.

The state at this time is as shown in FIG. 1B.

Incidentally, the generation of the loop back setting command by the CN is carried out by setting the loop back setting code in a CMD area included in an SVC area of the frame format shown in FIG. 9B.

In the prior art example, the time-out period T2 of the guard timer Tm2 must be set to a period which covers all the time-out periods T3 of the guard timers Tm3 set in the respective LNs. On the other hand, in the present embodiment, the CN sets the time-out period T2x of the guard timer Tm2x approximately to the minimum period of the establishment of the frame synchronization on both of the loop transmission line.

The CN next transmits the loop back determination command at the time t7 after the lapse of the time out period T2x set on the guard timer Tm2x.

The loop back determination command can be designated by setting in the CMD area included in the SVC area in the frame header GS0 a predetermined bit pattern different from that of the loop back setting command. The CN starts a frame guard timer Tm1X (timeout period T1x) at the same time.

The respective LNs receive the loop back determination command from the CN and checks whether the frame synchronization has been established. The LNs which detect that the frame synchronization is normal on both of the loop transmission lines release the loop back state, whereas the LNs which detect that the frame synchronization is abnormal on at least one of the left-direction and right-direction loop transmission line maintains the loop back state (hereinbelow, the LN thus maintaining the loop back state is called "the loop back point LN").

The CN checks again whether the frame synchronization has been established after the lapse of the time-out period T1x of the frame guard timer Tm1. If the frame synchronization is normal on both loop transmission lines, the CN releases the dual line loop back state and transmits a loop back diagnosis command to specify the state of LNs and the loop back operation at the time t8:

The CN creates the frame which has a particular LN address (Diagnosis start address) set in an STA area in the frame header GS0 and transmits the same on the loop transmission lines.

The LN which first has received the loop back diagnosis command determines whether or not its own LN address is coincident with the LN address stored in the STA area in the local node diagnosis command.

The LN, the LN address of which is coincident with that in the local node diagnosis command, sets its loop back state in two bits (b1, b2) of the LBI at the byte position (B3 in this case) of the LSI area of the received local node diagnosis command and transmits the same to the next LN, in accordance with FIG. 9E. The next LN sets its loop state in the LBI bit of the LSI area (B2 in this case) in a manner similar to the above in accordance with FIG. 9E.

Thus, the establishment of the frame synchronization on both loop transmission lines (i.e., whether or not the loop back state is being maintained) of the LNS are finally transmitted to the CN from the Ln which has first received the loop back diagnosis command to the eighth LN.

The CN can specify the loop back point LN by changing the LN address in the STA area of the local node diagnosis command at intervals of eight addresses.

In other words, the establishment of normal loop back is determined on the loop network if it is detected that two loop back point NLs are successively detected in the loop transmission lines, and one loop back point is maintained in the right-to-left loop back and the other is maintained in the left-to-right loop back.

If a normal loop back state is not established on the loop network, the CN once transmits a loop back release command to all the LNs.

The loop back release command is designated by setting a particular bit pattern in the CMD area included in the SVC area of the frame header GS0.

Among the respective LNs which have received the loop back release command, those being in the loop back state perform loop back release.

Then, a sequence of the above-mentioned loop back operation is again performed after a predetermined time interval.

The loop back operation may be retried predetermined times (retry), and if the loop back state cannot be formed within the number of times of retry, it is regarded as the fault of loop back operation.

The LN which is set up in the active state can, after the formation of the loop back, determine its own state on the loop transmission line in the following manner:

When the loop back state is formed, the respective CN sets the two addresses of the loop back point LNs in the CDT area in the loop back determination command and retransmits the same above-mentioned loop back determination command.

Upon receiving the loop back determination command from the CN, the respective newly set up LN compares the addresses of the two loop back point LNs in the CDT area with its own LN address thereof. If one of the addresses of the two loop back point LNs is coincident with its own address, the LN sets the loop back state such that it becomes the loop back point LN. If they are not coincident, the LN performs a relay operation.

This operation allows the LN which has been reset by the operational miss manipulation to be started again and take part in the loop network even after the loop back state has been formed on the transmission lines.

The respective commands in the loop back processing are set in the frame header GS0 and cyclically transmitted on the loop transmission lines, whereby the respective LNs can detect the command at intervals of the constant period. It is therefore possible to again detect the command even if an LN once fails to receive the command.

I claim:

1. A loop back method for a duplex loop-type LAN transmission system which comprises a plurality of local node units, at least one center node unit for supervising a loop back operation in said duplex loop-type LAN system and first and second transmission lines operating respectively as an active and a backup loop transmission line and having opposite signal transmission directions relative to each other, said plurality of local node units and said center node unit being interconnected serially through each of said first and second transmission lines, said method comprising:

(a) employing said center node unit to determine that a line failure exists in said first and second transmission lines by transmitting synchronous frame signals on said first and second transmission lines and by detecting, when said frame signals are returned to said center unit through said first and second transmission lines, an abnormality in synchronization of said frame signals, and if a said line failure is determined to exist, to send out through said first and second transmission lines a loop back setting command for instructing each of said local node units to form within itself a local unit loop back path between said first and second transmission lines;

(b) employing said center node unit to form a dual line loop back configuration within itself, said dual line loop back configuration being such that (i) each of said first and second transmission lines is reversibly disconnected within said center unit to include a receiver side and a transmitter side, wherein said first transmission line includes a receiver side R1 and a transmitter side T2 and said second transmission line includes a receiver side R2 and a transmitter side T1, and (ii) a first loop back path is formed between said receiver side R1 and said transmitter side T1 and a second loop back path is formed between said receiver side R2 and said transmitter side T2;

(c) employing each of said local node units, upon their receipt of said loop back setting command through one of said first and second transmission lines, to form within itself a said local unit loop back path through which said loop back setting command received form one of said first and second transmission lines is returned to the other of said first and second transmission lines and to said center node unit, whereby said local unit loop back path of each of said local node units is connected across one of said first and second loop back paths of said dual line loop back configuration through a next adjacent local node unit;

(d) employing each of said local node units to return, through its local unit loop back path, said loop back setting command to said center node unit during a predetermined time period;

(e) employing said center node unit to detect normal frame synchronization with respect to said loop back setting command which is returned thereto from each of said local node units during said predetermined time period;

(f) employing said center node unit to send out a loop back determination command through said transmitter side T1 and said transmitter side T2 of said dual line loop back configuration for instructing each of said local node units to determine individually whether its local unit loop back path is to be maintained or released;

(g) employing each of said local node units, in response to their receipt of said loop back determination command from either said transmitter side T1 and said transmitter side T2 of said dual line loop back configuration, to indicate to said center node unit whether the local node unit itself is receiving input signals on both said first line and said second line and whether frame synchronization exists on both said first line and said second line, and if so, to release its local unit loop back path and if not, to maintain its local unit loop back path;

(h) employing said center node unit to determine whether frame synchronization exists on both said first and second loop back paths of said dual line loop back configuration to create a single loop which includes local loop back paths of two of said local node units that are adjacent to and on opposite sides of said line failure and to send out a loop back diagnosis command over one of said first and second transmission lines for instructing each of said local node units to check frame synchronization of any signals being input thereto on both of said first and second transmission lines;

(i) employing each of said local node units, upon their receipt of said loop back diagnosis command, to send back to said center node unit said loop back diagnosis command having added thereto check result information indicating whether frame synchronization exists as to any signals input thereto on both of said first and second transmission lines; and (j) employing said center node unit to determine, from said loop back diagnosis command having added thereto said check result information, a location of said line failure existing on said first and second transmission lines.

2. A method as in claim 1, wherein said frame signals include a pattern field for establishing frame synchronization of transmitted data, a command code field for specifying a function of a command, a local node address field for detecting an address of a local node unit which maintains its local unit loop back path, a start address field for designating a start address of a local node unit to which said center node unit starts sending of said loop back diagnosis command, and a local node status field for writing therein a response data from said local node unit responding to said loop back diagnosis command.

3. A method as in claim 1, wherein said loop back setting command in step (a), said loop back determination command in step (f) and said loop back diagnosis command in step (h) are sent out by said center node unit periodically at several different times to perform a plurality of successive trouble search and loop back operations.

4. A method as in claim 2, wherein said local node status field has a plural bit set area including two bits for indicating a state of frame synchronization of both said receiver side R1 and said receiver side R2.

5. A method as in claim 4, wherein said check of frame synchronization in step (i) comprises employing each of said local node units to compare address data of said start address field with its own local node address to determine whether they are coincident or non-coincident, and if coincident, to set its own state indicating frame synchronization on said receiver side R1 and said receiver side R2 to a first bit set area of said local node status field and to send out said loop back diagnosis command to a next adjacent local node unit, and if noncoincident, to retransmit said loop back diagnosis command to a next adjacent local node unit.

6. A method as in claim 2, wherein step (j) comprises employing said center node unit to distinguish between addresses of two local node units which are adjacent to and on opposite sides of said line failure via a different bit pattern of said local node status field and to distinguish between addresses of two local node addresses via a different bit pattern corresponding to a loop back state from said first transmission line to said second transmission line and a loop back state from said second transmission line to said first transmission line.

7. A method as in claim 6, wherein said center unit is employed to judge whether a normal loop back operation has been formed by detecting that a loop back path exists in only two local node units and that a different bit pattern of said local node status field exists in said two local node units.

8. A loop back method for a duplex loop-type LAN transmission system which comprises a plurality of local node units, at least one center node unit for supervising a loop back operation in said duplex loop-type LAN system and first and second transmission lines operating respectively as an active and a backup loop transmission line and having opposite signal transmission directions relative to each other, said plurality of local node units and said center node unit being interconnected serially through each of said first and second transmission lines, said method comprising:

(a) employing said center node unit to determine that a line failure exists in said first and second transmission lines by transmitting synchronous frame signals on said first and second transmission lines and by detecting, when said frame signals are returned to said center unit through said first and second transmission lines, an abnormality in synchronization of said frame signals, and if a said line failure is determined to exist, to send out through said first and second transmission lines a loop back setting command for instructing each of said local node units to form within itself a local unit loop back path between said first and second transmission lines;

(b) employing each of said local node units, upon their receipt of said loop back setting command through one of said first and second transmission lines, to form within itself a said local unit loop back path through which said loop back setting command received from one of said first and second transmission lines is returned to the other of said first and second transmission lines and to said center node unit, whereby said local unit loop back path of each of said local node units is connected across said first and second transmission lines and a next adjacent local node unit;

(c) employing each of said local node units to return, through its local unit loop back path, said loop back setting command to said center node unit during a predetermined time period;

(d) employing said center node unit to detect normal frame synchronization with respect to said loop back setting command which is returned thereto from each of said local node units during said predetermined time period;

(e) employing said center node unit to send out a loop back determination command through said first and second transmission lines for instructing each of said local node units to determine individually whether its local unit loop back path is to be maintained or released;

(f) employing each of said local node units, in response to their receipt of said loop back determination command from either said first transmission line and said second transmission line, to indicate to said center node unit whether the local node unit itself is receiving input signals on both said first transmission line and said second transmission line and whether frame synchronization exists on both said first transmission line and said second transmission line, and if so, to release its local unit loop back path and if not, to maintain its local unit loop back path, whereby a single loop is created which includes local loop back paths of two of said local node units that are adjacent to and on opposite sides of said line failure;

(g) employing said center node unit to send out a loop back diagnosis command over one of said first and second transmission lines for instructing each of said local node units to check frame synchronization of any signals being input thereto on both of said first and second transmission lines;

(h) employing each of said local node units, upon their receipt of said loop back diagnosis command, to send back to said center node unit said loop back diagnosis command having added thereto check result information indicating whether frame synchronization exists as to any signals input thereto on both of said first and second transmission lines; and (i) employing said center node unit to determine, from said loop back diagnosis command having added thereto said check result information, a location of said line failure existing on said first and second transmission lines.

* * * * *